Patented Dec. 27, 1938

2,141,729

UNITED STATES PATENT OFFICE 2,141,729

POLISHING COMPOSITION

Theodore R. Thompson, Flint, Mich., assignor to E. I. du Pont de Nemours & Company, Wilmington, Del., a corporation of Delaware No Drawing. Application May 8, 1937, Serial No. 141,569

4 Claims. (Cl. 134—24)

This invention relates to a composition suitable for polishing or cleaning, and more particularly to a polish which is neutral and stable.

Heretofore, emulsified polishing or cleaning compositions have been prepared with one or more emulsifying agents which in general may fall into one of three classes.

The first class is represented by emulsifying agents which are principally characterized by their bodying or thickening action when dispersed in water. A secondary characteristic of this group is that there may be some lowering of interfacial tension and further that the aqueous solutions are usually essentially neutral. Examples of materials falling in this class are gums such as tragacanth, arabic, locust bean, certain proteins such as glue, gelatin, albumen; carbohydrates such as ordinary starch, methyl starch; certain ethers such as water-colloidable methyl cellulose. Irish moss is also an example of this class.

A second group of emulsifying agents consists of soaps or alkaline salts of fatty acids. The principal characteristic of this group is the ability of the agents to lower the interfacial tension between the continuous and dispersed phases. Agents of this class however, due to hydrolysis, generally have an alkaline reaction in water and may also have some bodying action. Typical examples of this group are sodium, potassium, ammonium, or amine salts of fatty acids such as oleic, stearic, abietic, palmitic, lauric, and the like. Materials of this class may also be formed by reacting or dissolving casein, shellac, or other acidic materials in mildly alkaline solutions.

A third general group functions principally by means of lowering of the interfacial tension, but differs from the preceding class in that its members are generally much less alkaline in solution. Examples of this type are sulfonated oils and their alkaline salts of which Turkey red oil is probably the most common.

Each of the groups mentioned above is characterized by certain inherent deficiencies which make them not entirely suitable for the preparation of polishes, cleaners and the like. For example, when these are prepared with an emulsifying agent of the first group mentioned above, the wetting and spreading properties are usually relatively poor. This may be corrected by the addition of an auxiliary emulsifying agent selected from the other two groups. If such an agent has an alkaline reaction which is typical of the second group, the polish so prepared is usually unsuitable for fine automobile and furniture finishes which are often injured by alkali. Furthermore, the effectiveness of bodying agents of the first group is often destroyed by the addition of an alkaline agent since they frequently function to their best advantage in neutral or very slightly acidic solutions. For example, gum tragacanth is most efficient in slightly acid solutions. If an alkaline emulsifying agent of Group II is added, the polish thins out and if any abrasive is present, it will probably settle. The addition of more bodying or thickening agents to improve the bodying of the polish is generally unsatisfactory under such circumstances because of their tendency to act as mucilages, and consequently interfere with the working properties of the polish.

If a small quantity of an emulsifier of the class indicated by the third group above should be added as an auxiliary emulsifying and wetting agent, it has been found in general that better results will be obtained but the degree of wetting and lowering of interfacial tension obtainable with agents of this type is definitely limited and the amount that can be added is rather critical, since the addition of too much may cause the emulsion to lose much of its stability.

Polishes prepared with agents selected from the second and third group are also not entirely satisfactory for the reason that the stability is of a relatively low order and it is difficult to keep an abrasive in suspension due principally to its low viscosity.

The present invention has as an object the provision of a method of preparing stable, neutral, emulsified compositions suitable for polishing and cleaning.

Another object of the invention is the preparation of polishing compositions in which the hydrogen ion concentration can be adjusted to suit the particular requirements of the surface to be polished without impairment of the stability of the polishing composition.

Another object of the invention is the lowering of the surface and interfacial tension of the aqueous phase of emulsified polishing compositions containing an agent or agents of the bodying type such as mentioned in Group I above, thereby improving their wetting, spreading, application, and cleaning properties without impairing or adversely affecting any of the other properties of the composition.

A still further object is the preparation of an emulsion having a low surface and interfacial tension of the aqueous phase of the emulsified composition in which the principal emulsifying agent is one of the bodying type such as those mentioned in Group I above, but which has been modified to render it stable, neutral, and satisfactory with respect to wetting and spreading properties. Other objects will be apparent as the description of the invention proceeds.

These objects are obtained through the use of an emulsifying agent of the bodying type in combination with an alkali salt of sulfated higher alcohols.

The alkali salts of sulfated higher alcohols have the ability to lower the interfacial tension and function as emulsifying and wetting agents in neutral, slightly acidic and slightly alkaline solution. Pure aqueous solutions of these salts are substantially neutral themselves, thereby easily permitting the formation of neutral emulsions. It has been found that if compounds of this type are used in combination with gum tragacanth, gum arabic, bentonite, locust bean gum, starch, albumen, glue, gelatin, Irish moss, and certain carbohydrate ethers such as water-colloidable methyl cellulose, an emulsion may be prepared of agents ordinarily used in polishes which gives them practically all of the advantages of all three groups of emulsions mentioned above without any of the disadvantages mentioned. In other words, the surface and interfacial tension of polishing compounds so prepared can be lowered to almost any practical degree, thereby greatly improving the wetting, spreading application and cleaning properties thereof, without impairing or adversely affecting any of the other properties of the composition.

The following examples illustrate how the invention may be applied to a mildly abrasive cleaner and polish, but these examples are given by way of illustration and not by way of limitation, the parts therein being expressed in percentages by weight:

Example I

| | |
|---|---|
| Gum tragacanth | .20 |
| Water | 63.15 |
| Alkali metal salt of a sulfated alcohol having more than 8 carbon atoms | .50 |
| Glycerine | 5.65 |
| Diatomaceous earth | 12.25 |
| Neutral oil | 17.00 |
| Amyl acetate | .25 |
| Formaldehyde | 1.00 |
| | 100.00 |

The above formula represents a very satisfactory mildly abrasive polish and cleaner having excellent wetting and spreading properties. The degree of wetting can easily be controlled by varying the amount of alkali metal salt of a sulfated alcohol having more than 8 carbon atoms. A range of from 0.1% to 1.0% is practical, depending on the degree of wetting desired. Karaya gum, locust bean gum, Irish moss, water colloidable methyl cellulose, starch, etc., may be substituted for the gum tragacanth, if desired. The ingredients may be compounded by dispersing the water-soluble gum in the water and adding the other materials with stirring. The order of their addition is not important except that it is preferable to dissolve the sulfated alcohol in a small amount of the water and to add it last in order to avoid excessive foam.

Example II

| | |
|---|---|
| Water | 61.80 |
| Alkali metal salt of a sulfated alcohol having more than 8 carbon atoms | .20 |
| Neutral oil | 20.00 |
| Castor oil | 10.00 |
| Mineral spirits | 7.50 |
| Citronellal | .50 |
| | 100.00 |

This formula represents a non-abrasive, neutral oil type polish. It is prepared by dissolving the alkali metal salt of a sulfated alcohol having more than 8 carbon atoms in the water and adding the oils, previously mixed, with agitation. A finer dispersion may be obtained by passing the finished product through a colloid mill. This polish is suitable for use on all fine automobile and furniture finish where a neutral non-abrasive oil type polish is desired. This example represents a fairly satisfactory polish. However, it is necessary to increase its body for most purposes. In order to do this, gum tragacanth or the equivalents mentioned above may be incorporated until the desired consistency is reached.

Example III

| | |
|---|---|
| Beeswax | 1.00 |
| Carnauba wax | .10 |
| Neutral oil | 11.00 |
| Mineral spirits | 7.00 |
| Bentonite | 5.00 |
| Borax | .20 |
| Water | 47.70 |
| Alkali metal salt of a sulfated alcohol having more than 8 carbon atoms | 1.00 |
| Diatomaceous earth | 11.00 |
| Air float tripoli | 16.00 |
| | 100.00 |

The above formula represents a paste type, abrasive cleaner, primarily designed for cleaning chalked pigment, etc., from weathered automobile finishes preparatory to waxing. In preparing this formula, the waxes and oils are melted together and heated to about 80° C., the bentonite is dispersed therein, and the water, in which the borax and alkali metal salt of a sulfated alcohol having more than 8 carbon atoms has been dissolved and heated to boiling is then added with high speed agitation. The emulsion thus formed is then transferred to a low speed mixer where the abrasives are added and stirred until smooth.

In the claims, the term "emulsifying agent of the bodying type" refers to those listed in Group I above; that is gum tragacanth, gum arabic, bentonite, locust bean gum, starch, albumen, karaya gum, Irish moss, water-colloidable methyl cellulose, and the like. It will also be apparent that perfumes, colors, and similar modifying agents may be used where desired. It will also be obvious that other neutral oils, waxes, solvents, and the like may be used in place of those mentioned.

The percentage of emulsifying agent of the bodying type may vary up to 5% or even more depending upon the degree of body desired in the polish. Likewise, the percentage of alkali metal salt of a sulfated alcohol having more than 8 carbon atoms may vary between .1% and 1.0%, although even a slightly larger amount may be used for special purposes. In the claims, the term "alkali metal salt" of the sulfated alcohol is intended to be generic to ammonium, and amine salts as well as the true alkali metal salts. These salts are water-soluble sulfuric acid esters of the higher primary fatty alcohols having at least 8 carbon atoms and preferably 12 to 18 carbon atoms in the molecule.

I am aware of U. S. Patent No. 2,009,633 in which a wax water-oil emulsion is prepared using a salt of a sulfated higher alcohol as an emulsifying agent. However, I do not make claim to the invention therein disclosed since my invention may be regarded as a modification of that patent in which emulsions are prepared using a combination of an alkali metal salt of a sulfated alcohol having more than 8 carbon atoms, and an agent of the bodying type as herein disclosed.

It is apparent that many widely different embodiments of this invention may be made without departing from the spirit and scope thereof; and, therefore, it is not intended to be limited except as indicated in the appended claims.

I claim:

1. An emulsion of the oil-in-water type having a low surface and interfacial tension comprising as an emulsifying agent an alkali metal salt of a sulfated alcohol having at least 8 carbon atoms and another emulsifying agent of the bodying type, a non-drying oil as the dispersed phase, and water as the continuous phase.

2. Product of claim 1 in which the oil phase contains a solution of a wax.

3. Product of claim 1 in which the emulsion contains a mild abrasive.

4. A polishing composition having approximately the following percentage composition by weight:

| | |
|---|---:|
| Gum tragacanth | .20 |
| Water | 63.15 |
| Alkali metal salt of a sulfated alcohol having more than 8 carbon atoms | .50 |
| Glycerine | 5.65 |
| Diatomaceous earth | 12.25 |
| Neutral oil | 17.00 |
| Amyl acetate | .25 |
| Formaldehyde | 1.00 |
| | 100.00 |

THEODORE R. THOMPSON.